United States Patent
Schwarzmueller

(10) Patent No.: US 8,755,466 B2
(45) Date of Patent: Jun. 17, 2014

(54) RECEIVER, RECEIVING METHOD, AND USE OF AN IN-PHASE SIGNAL AND A QUADRATURE-PHASE SIGNAL

(75) Inventor: Marco Schwarzmueller, Heilbronn (DE)

(73) Assignee: Atmel Corporation, San Jose, CA (US)

( * ) Notice: Subject to any disclaimer, the term of this patent is extended or adjusted under 35 U.S.C. 154(b) by 1009 days.

(21) Appl. No.: 12/358,329

(22) Filed: Jan. 23, 2009

(65) Prior Publication Data

US 2009/0190698 A1     Jul. 30, 2009

Related U.S. Application Data

(60) Provisional application No. 61/023,356, filed on Jan. 24, 2008.

(30) Foreign Application Priority Data

Jan. 24, 2008   (DE) .................... 10 2008 005 981

(51) Int. Cl.
*H03D 3/22*     (2006.01)
*H04B 1/16*     (2006.01)
*H04L 7/06*     (2006.01)

(52) U.S. Cl.
USPC ............ 375/332; 455/208; 455/209; 455/260

(58) Field of Classification Search
USPC ................. 375/316, 324, 326, 327, 329, 332; 455/205, 208, 209, 255, 260
See application file for complete search history.

(56) References Cited

U.S. PATENT DOCUMENTS

| | | | |
|---|---|---|---|
| 4,878,029 A * | 10/1989 | Saulnier et al. | 329/341 |
| 4,888,557 A * | 12/1989 | Puckette et al. | 329/341 |
| 5,146,617 A | 9/1992 | Moen, Jr. | |
| 5,263,055 A | 11/1993 | Cahill | |

(Continued)

FOREIGN PATENT DOCUMENTS

| | | |
|---|---|---|
| DE | 601 08 908 T2 | 2/2006 |
| EP | 0 523 938 B1 | 10/1997 |
| EP | 1 405 417 B1 | 2/2005 |

OTHER PUBLICATIONS

Koch Harry: "Design, Calculations, and Construction of Receivers using Transistors", Transistor Receivers, 1972, Munich, Franzis-Verlag, ISBN 3-7723-5741-5, pp. 228-231.

(Continued)

*Primary Examiner* — Young T. Tse
(74) *Attorney, Agent, or Firm* — Baker Botts LLP

(57) ABSTRACT

A receiver, receiving method, and use of an in-phase signal and a quadrature-phase signal is provided, that includes a mixer in the receiving path, an oscillator whose output is connected to a mixer input of the mixer, whereby the oscillator is formed to output a base signal, oscillating at a base frequency, at the output, a clock generation device to generate a clock signal from the base signal, whose input is connected to the output of the oscillator, whereby the clock generation device has a frequency converter for converting a base frequency of the base signal by the factor $F=x+A$, where x is a positive whole number and A a rational number between 0 and 1, and a signal processing device, which is connected downstream of the mixer in the receive path, whereby the signal processing device is connected to the clock generation device for control with the clock signal.

6 Claims, 3 Drawing Sheets

(56) References Cited

U.S. PATENT DOCUMENTS

| | | | |
|---|---|---|---|
| 5,373,531 A * | 12/1994 | Kawasaki | 375/150 |
| 5,584,062 A * | 12/1996 | Meador et al. | 455/260 |
| 5,926,514 A | 7/1999 | Meador et al. | |
| 6,337,976 B1 * | 1/2002 | Kudou | 455/258 |
| 6,999,723 B2 | 2/2006 | Kusbel et al. | |
| 7,180,347 B2 | 2/2007 | Azmoodeh | |
| 2001/0033611 A1 * | 10/2001 | Grimwood et al. | 375/219 |
| 2007/0116147 A1 | 5/2007 | May et al. | |
| 2007/0160169 A1 * | 7/2007 | Tanaka et al. | 375/326 |
| 2008/0164917 A1 * | 7/2008 | Floyd et al. | 327/117 |
| 2009/0081983 A1 * | 3/2009 | Rofougaran et al. | 455/314 |

OTHER PUBLICATIONS

Nagendra Krishnapura and Peter R. Kinget, "*A 5.3-GHz Programmable Divider for HiPerLAN in 0.25-μm CMOS*", IEEE Journal of Solid-State Circuits, vol. 35, No. 7, pp. 1019-1024, Jul. 2000.

* cited by examiner

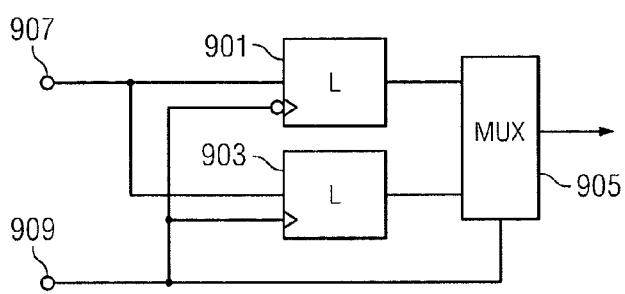
*FIG. 6*
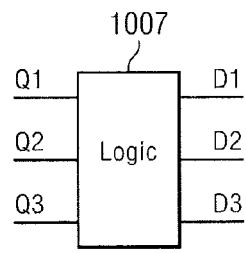
*FIG. 7b*
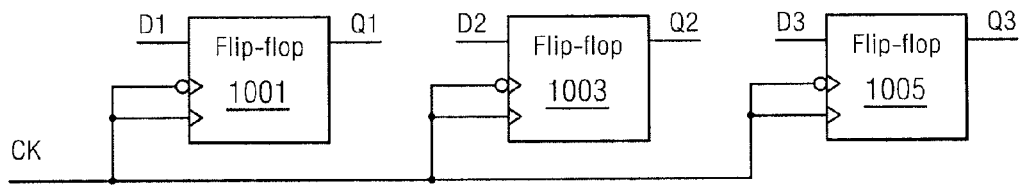
*FIG. 7a*
| Q | Q3 | Qz | Q1 | D=D₁+2D₂+4D₃ |
|---|----|----|----|--------------|
| 0 | 0  | 0  | 0  | 1 |
| 1 | 0  | 0  | 1  | 2 |
| 2 | 0  | 1  | 0  | 3 |
| 3 | 0  | 1  | 1  | 4 |
| 4 | 1  | 0  | 0  | 0 |
| 5 | 1  | 0  | 1  |   |
| 6 | 1  | 1  | 0  |   |
| 7 | 1  | 1  | 1  |   |
*FIG. 7c*
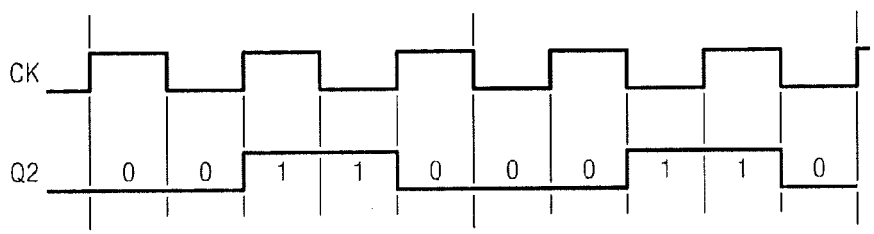
*FIG. 7d*

RECEIVER, RECEIVING METHOD, AND USE OF AN IN-PHASE SIGNAL AND A QUADRATURE-PHASE SIGNAL

This nonprovisional application claims priority to German Patent Application No. 102008005981.1, which was filed in Germany on Jan. 24, 2008, and to U.S. Provisional Application No. 61/023,356, which was filed on Jan. 24, 2008, and which are both herein incorporated by reference.

BACKGROUND OF THE INVENTION

1. Field of the Invention

The present invention relates to a receiver, a receiving method, and use of an in-phase signal and a quadrature-phase signal.

2. Description of the Background Art

To improve the noise immunity of a receiver, analog receiving circuits and digital signal processing processors can be separated on a semiconductor chip by decoupling, screening, and isolation measures. It is possible, furthermore, to increase the noise immunity of a receiver by using differential inputs. If an analog receiving circuit and the digital signal processing are formed on two separated semiconductor chips, the noise immunity of the analog receiving circuit can again be considerably increased.

SUMMARY OF THE INVENTION

It is therefore an object of the present invention is to improve the noise immunity of a receiver as much as possible.

Accordingly, a receiver is provided. The receiver can be integrated monolithically into a semiconductor chip. The receiver, for example, receives an incoming signal over an antenna. The receiver preferably has a mixer in the receive path. A receive path is preferably taken to mean connections and subcircuits for processing the received signal. Subcircuits of this type are, for example, a mixer, amplifier, sampling circuit, analog-to-digital converter, demodulator, etc. The mixer is preferably used for downmixing the incoming signal to an intermediate signal with an intermediate frequency. The intermediate frequency is preferably magnitudes smaller than (useful) frequencies of the incoming signal (near zero IF, low IF). Downmixing to an intermediate frequency of 0 Hz (baseband) can also be done. Preferably, the intermediate frequency is less than 1 MHz, for example, 250 kHz.

The receiver has an oscillator (local oscillator) whose output is connected to a mixer input of the mixer. The oscillator is formed to output a base signal, oscillating at a base frequency, at the output. The base signal can have one or more phase-offset partial signals.

Furthermore, the receiver has a clock generation device to generate a clock signal from the base signal. The input of the clock generation device is connected to the output of the oscillator. Inputs and outputs in this case can have one or more single connections. The clock generation device has a frequency converter. The frequency converter is formed to convert a base frequency of the base signal by the factor $F=x+A$.

Wherein, x is a positive whole number. A is a positive rational number between 0 and 1. For example, A is a positive fraction of whole numbers less than 1, in particular a reciprocal value of a positive whole number. x is, for example, a member of $\{1; 2; 3; 4; 5\}$. A is, for example, a member of $\{½; ⅓; ¼; ⅕\}$.

Furthermore, the receiver can have a signal processing device. The signal processing device is connected downstream of the mixer in the receive path. In this case, the incoming signal is processed preferably first by the mixer, and preferably after downmixing the downmixed signal is processed by the advantageously at least partial digital signal processing device. The signal processing device is connected to the clock generation device. This connection is formed to control the signal processing device with the clock signal.

The object of the invention is furthermore to provide as improved a receiving method as possible.

Accordingly, a method is provided for receiving an incoming signal. The incoming signal has one or more receive frequencies or a receive frequency range with a plurality of frequencies for information transmission.

The incoming signal is downmixed by means of a base signal of an oscillator with a base frequency to an intermediate signal with an intermediate frequency. The intermediate frequency here is advantageously significantly smaller than the useful frequencies of the incoming signal.

A clock signal is generated from the base signal by conversion by the factor $F=x+A$. x is a positive whole number. A is a positive rational number between 0 and 1. For example, A is a positive fraction of whole numbers less than 1, in particular a reciprocal value of a positive whole number. x is, for example, a member of $\{1; 2; 3; 4; 5\}$. A is, for example, a member of $\{½; ⅓; ¼; ⅕\}$.

The intermediate signal with the intermediate frequency is evaluated as a function of the clock signal. Preferably, the clock signal controls an arithmetic logic unit, which is formed and set up to evaluate the intermediate signal.

The object of the invention furthermore is to provide a use of an in-phase-signal and a quadrature-phase signal of an oscillator of a receiver.

Accordingly, a use is provided of an in-phase signal and a quadrature-phase signal of an oscillator of a receiver for generating a clock signal in particular for a signal processing device downstream of a mixer and/or an amplifier. Beginning with an edge of the in-phase signal or of the quadrature-phase signal, the edges of the in-phase signal and of the quadrature-phase signal are counted alternately. A counter state is increased or reduced in each counted edge. At a counter state M of $M=2m+1$, a rising or falling edge of the clock signal is generated. Here, m is a predefined positive whole number. For example, m is a member of $\{1; 2; 3; 4; 5\}$.

The refinements described hereinafter relate both to the receiver and to the use of the in-phase signal and of the quadrature-phase signal, as well as to the receiving method.

Preferably, $A=½$, so that the fundamental waves of the respective signal and its harmonic do not overlap.

The frequency converter can have a frequency multiplier, which is formed to multiply the base frequency by the factor F. The frequency converter can multiply, for example, the base frequency by the factor F. It is also provided preferably, however, that the frequency converter has a frequency divider, which is formed to divide the base frequency by the factor F.

The frequency converter can have, for example, a plurality of flip-flops, for example, double-edged triggered flip-flops for conversion.

Additional clock signals can be derived from the clock signal, for example, by division. The fundamental frequencies of the additional clock signals are determined by the respective period duration. Additional clock signals differ from one another and/or from the clock signal preferably by a factor $G=2y+1$. Preferably, the clock generation device has an additional frequency converter for converting a clock frequency of the clock signal by the factor $G=2y+1$ into another clock signal with another clock frequency, where y is a positive whole number. y may differ from x in this case.

The additional frequency converter can have an additional frequency multiplier or an additional frequency divider. The frequency divider is formed to divide the clock frequency by the factor G.

According to a further embodiment, the clock generation device comprises a plurality of frequency converters for providing a plurality of clock signals. The frequency converters are connected in series. Each frequency converter is formed to convert the frequency of an output clock signal of a frequency converter, connected upstream from it, by the factor $H=2z+1$, particularly to divide or to multiply it. In this case, z and therefore H may be different for each frequency converter.

According to an especially preferred refinement, it is provided that the oscillator is formed to output an in-phase signal and a quadrature-phase signal as a base signal with the base frequency. The in-phase signal and quadrature-phase signal are preferably phase-offset to one another by 90° relative to a period.

The clock generation device is formed to count alternately the edges of the in-phase signal and of the quadrature-phase signal, to increase or decrease a counter state for each counted edge.

The clock generation device is formed to generate a rising or falling edge at a counter state of $M=2m+1$, where m is a predefined positive whole number. M thereby is a counter state corresponding to an odd number, such as, for example, a member of $\{3, 5, 7\}$.

According to an advantageous embodiment, the clock generation device has an edge counter for counting the edges. Preferably, the clock generation device has a signal generator for generating an edge.

It is provided in an embodiment, that the signal processing device has an analog-to-digital converter to sample and convert the analog intermediate signal into a digital signal. Especially, the signal processing device has a digital arithmetic logic unit, particularly a digital signal processor, which demodulates the sampled and converted intermediate signal to extract the transmitted data.

It is provided in an embodiment that for evaluation, the intermediate signal with the intermediate frequency is sampled and/or demodulated as a function of the clock signal. Preferably, the sampling rate of the analog-to-digital converter of the signal processing device is derived from the clock signal or identical therewith. Other method features arise from the functionality of the clock generation device. According to one aspect, the invention provides a computer program for carrying out the method according to the invention, when the computer program runs on an arithmetic logic unit or a computer.

The Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows a frequency converter;
and
FIGS. 7a to 7d show an exemplary embodiment of a frequency converter.

DETAILED DESCRIPTION

Figure 1:
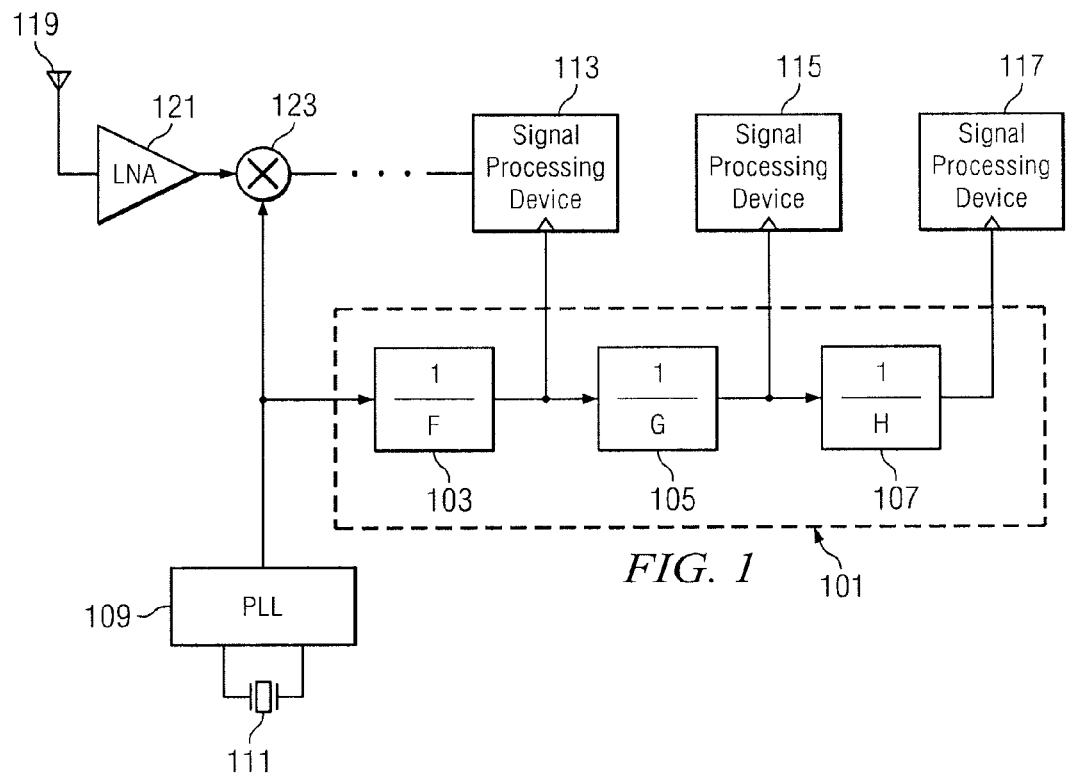
FIG. 1 shows a receiver.

FIG. 1 shows a receiver with a mixer 123 in the receive path. The receiver has furthermore an oscillator 111, 109 whose output is connected to a mixer input of mixer 123. Oscillator 111, 109 is formed to output a base signal, oscillating at a base frequency, at the output. The receiver has furthermore a clock generation device 101 to generate a clock signal from the base signal. The input of clock generation device 101 is connected to the output of oscillator 111, 109. Clock generation device 101 has a frequency converter 103 to convert a base frequency of the base signal by the factor $F=x+A$. In the exemplary embodiment of FIG. 1, F is a division factor. In this case, x is a positive whole number and A is a rational number between 0 and 1. In the exemplary embodiment of FIG. 1, $x=3$ and $A=\frac{1}{2}$.

An integrated digital circuit (113, 115, 117), such as a demodulator, a microprocessor, or a signal processor, is controlled by the required clock signal. In this case, harmonics can also occur, which interfere with the incoming signal. If according to the exemplary embodiment of FIG. 1, however, the (digital) clock signal is derived from the base signal of oscillator 109, 111 for mixer 123 by using a divider 103, which divides the base frequency by the factor F, then all clocks and their harmonics are precisely to the left and right of the receiving band and thereby within the stop band of the receiver. This applies particularly to receivers with an intermediate frequency close to zero Hertz or equal to zero Hertz. The block band is effected, for example, by a suitable receive filter.

Signal processing devices 113, 115, and 117 are connected downstream to mixer 123 in the receive path, signal processing devices 113, 115, and 117 being connected to clock generation device 101 for control with the clock signal.

FIG. 1 shows a receiver with a clock generation device 101, which has first frequency converter 103, a second frequency converter 105, and a third frequency converter 107. Furthermore, the receiver has an oscillator with a PLL (PLL: Phase Locked Loop) 109 and a quartz 111. Alternatively, a voltage-controlled LC tank circuit may also be used.

An output of PLL 109 is connected to an input of first frequency converter 103. An output of first frequency converter 103 is connected to an input of second frequency converter 105. An output of second frequency converter 105 is connected to an input of third frequency converter 107.

The receiver shown in FIG. 1 further has a first signal processing device 113, a second signal processing device 115, and a third signal processing device 117. A clock input of first signal processing unit 113 is connected to the output of first frequency converter 103. A clock input of second signal processing unit 115 is connected to the output of second frequency converter 105. A clock input of third signal processing unit 117 is connected to the output of third frequency converter 107.

The receiver of FIG. 1 comprises further an antenna 119 for receiving an incoming signal, downstream of which an amplifier 121, for example, an LNA amplifier (LNA: Low Noise Amplifier) is connected in the receive path. Instead of an antenna, a cable connection can also be provided, for example. An output of amplifier 121 is connected to a first input of mixer 123. An output of PLL 109 is connected to a second input of mixer 123. An output of mixer 123 is connected to an input of the signal processing step not shown in FIG. 1, which may have, for example, a receive filter, an analog-to-digital converter, and the like. An output of this signal processing step, which is not shown, is connected, for example, to an input of first signal processing device 113. The output of this signal processing step, which is not shown, can be connected further to inputs of signal processing devices 115 and 117. It is also possible to omit this signal processing step, which is not shown, and to connect the mixer directly to first signal processing device 113.

According to another embodiment, second signal processing device 115 can be connected downstream of the first signal processing device, whereby third signal processing device 117 can be connected downstream of second signal processing device 115.

Signal processing devices 113, 115, and 117 can be, for example, digital and/or analog filters, equalizers, demodulators, decoders, or other digital and/or analog signal processing circuits.

The incoming signal is mixed after amplification by amplifier 121 with use of the output signal of PLL 109, for example, to an intermediate frequency or directly into the baseband. PLL 109 is controlled by quartz 111. According to another embodiment, PLL 109 and quartz 111 can be replaced by an oscillator, for example, an LC oscillator, whose base signal is supplied directly to mixer 123. The output signal of PLL 109 or an oscillator replacing PLL 109 corresponds to the aforementioned oscillating base signal, whose fundamental frequency corresponds to the oscillation frequency of the output signal of the oscillator or of the output signal of PLL 109.

First frequency converter 103 can be, for example, a frequency divider, which divides the output frequency of PLL 109 by the factor x+0.5. x is preferably a natural number, for example, x=2 or x=3. Second frequency converter 105 connected downstream of first frequency converter 103 can also be a frequency divider, which divides the output frequency of first frequency converter 103 by the factor G=2y+1. In this case, y is a positive natural number different from x. Third frequency converter 107 connected downstream of second frequency converter 105 can also be a frequency divider, which divides the output frequency of second frequency converter 105 by the factor H=2z+1, where z is a positive natural number, which may be different from x and y.

First frequency converter 103 generates a clock signal for clocking first signal processing device 113. The choosing of the division factor as taught by the invention assures that the clock signal supplied to first signal processing device 113 has a fundamental frequency and its harmonics, which do not coincide with the used receive frequency or the used receive frequency range of the incoming signal.

Second frequency converter 105 makes sure by means of the division factor G=2y+1 that the clock signal supplied to second signal processing device 115 has a fundamental frequency and its harmonics, which do not coincide if possible with the used receive frequency or the used receive frequency range of the incoming signal and with the frequency of the incoming signal of second signal processing device 115.

In analogy to this, third frequency converter 107 makes sure by means of the division factor H=2z+1 that the clock signal supplied to third signal processing device 117 has a fundamental frequency and its harmonics, which do not coincide if possible with the used receive frequency or the used receive frequency range of the incoming signal and with the frequency of the incoming signal of third signal processing device 117.

Figure 2:
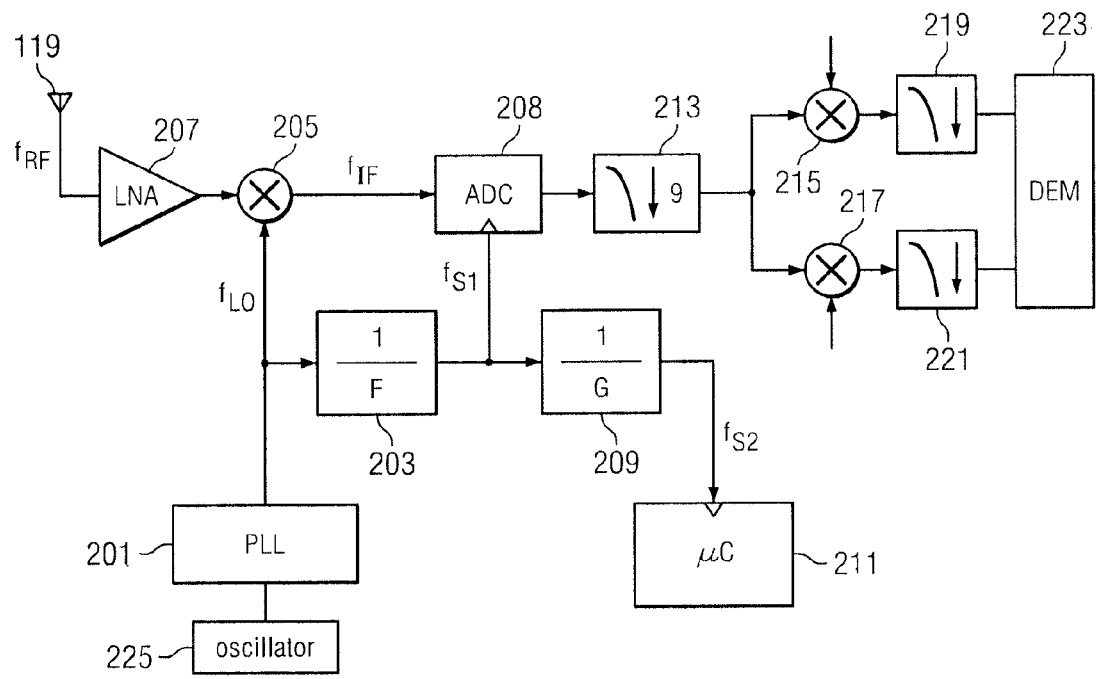
FIG. 2 shows a receiver.

FIG. 2 shows a receiver with a clock generation device 203, 209 and with a PLL 201, whose output is connected to an input of a first frequency converter 203 of the clock generation device. The output of PLL 201 emits the base signal with the frequency fLO and further is connected to a first input of a mixer 205. The received comprises further an antenna 119, which is connected over an amplifier 207 to a second input of mixer 205. An output of mixer 205 is connected to an analog-to-digital converter (ADC) 208, whose clock input is connected to an output of first frequency converter 203.

The clock generation device comprises further a second frequency converter 209, which is connected downstream of first converter 203 and has an output, which is connected to a clock input of a microcontroller (μC) 211.

An output of analog-to-digital converter (ADC) 208 is connected to an input of a lowpass filter 213, which performs optionally an undersampling by, for example, the factor of 9. An output of filter 213 is connected to a first mixer 215 and a second mixer 217. The outputs of mixers 215 and 217 are connected respectively to a filter 219 and 221. The outputs of filters 219 and 221 are connected to a demodulator 223. Filters 219 and 221 are, for example, lowpass filters, which may be formed further to perform another sampling rate conversion. PLL 201 is controlled by an oscillator 225, for example, by a quartz oscillator. According to another embodiment, PLL 201 can be replaced, for example, by a voltage-controlled oscillator, which may be an LC oscillator.

First frequency converter 203 is formed to carry out a frequency division by the factor F=x+½, to provide a clock signal with the clock frequency fs1 for the analog-to-digital converter (ADC) 208. The clock frequency corresponds, for example, to the sampling frequency of analog-to-digital converter (ADC) 208. Second frequency converter 209 divides the frequency of the output clock signal of first frequency converter 203 by the factor G=2m+1, to provide an additional clock signal for microcontroller 211. In this case, x and m are different natural numbers.

A signal received over the antenna at frequency $f_{RF}$ is downmixed after amplification to an intermediate frequency $f_{IF}$ with use of the output signal of PLL 201 and of mixer 205 and at the intermediate frequency $f_{IF}$ supplied to analog-to-digital converter (ADC) 208, which is clocked at the frequency fs1. After lowpass filtering and an optional sampling rate conversion by filter 213, the filter output signal is supplied to the quadrature mixer pair 215 and 217, which downmixes the mixer output signal, in each case with mixer signals displaced by 90°, for example, into the baseband. After lowpass filtering and an optional sampling rate conversion by filters 219 and 221, demodulation occurs; in this case, demodulator 223 may perform, for example, an amplitude demodulation, a frequency demodulation, a phase demodulation, or a quadrature amplitude demodulation.

Analog-to-digital converter (ADC) 208 and microcontroller 211 are thereby the signal processing devices fed by the clock signals of the clock generation device, whereby the demodulator can be clocked by an additional clock signal, which can be recovered with use of a third frequency converter from the output clock signal of second frequency converter 209 by a frequency division by an additional factor. Alternatively, the same clock signal can be used for the demodulator as for microcontroller 211.

Figure 3:
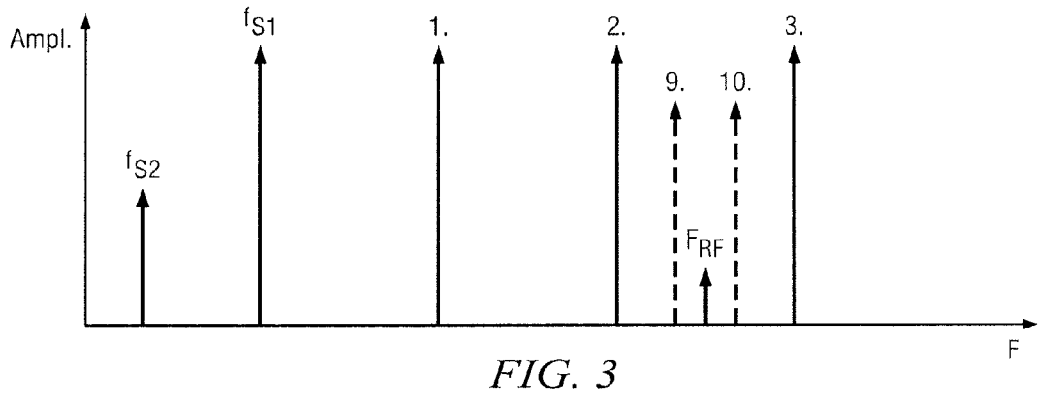
FIG. 3 shows a frequency plan.

FIG. 3 shows a frequency plan, which shows the position of the frequencies depicted in FIG. 2. $f_{S1}$ designates the first clock frequency and in the exemplary embodiment of FIG. 3 concurrently the sampling frequency $f_{ADC}$ of analog-to-digital converter (ADC) 208. Furthermore, the frequencies of the first harmonic (1.), the second harmonic (2.), and the third harmonic of the first clock signal are shown schematically. Furthermore, the utilized frequency $f_{RF}$ of the incoming signal is shown in FIG. 3. In this case, the amplitude of the incoming signal is shown considerably smaller than the interfering amplitudes of the first clock signal. It is evident that the receive frequency is formed in a region in the middle between two harmonics of the first clock signal, in the exemplary embodiment of FIG. 3 between the second and third harmonic. Further, the second clock signal is shown with the clock frequency $f_{S2}$. The ninth and tenth harmonics of the second clock signal are in turn to the left and right of the receive frequency $f_{RF}$ of the incoming signal. The signal parts of the harmonics of the first clock signal and of the second clock signal can therefore be easily filtered out by a filter. The base signal of the oscillator with the base frequency that deviates from the receive frequency $f_{RF}$ only in the intermediate frequency $f_{IF}$, is not shown. The deviation between the receive frequency $f_{RF}$ and the base frequency is thereby only minor for small intermediate frequencies $f_{IF}$.

Figure 4:
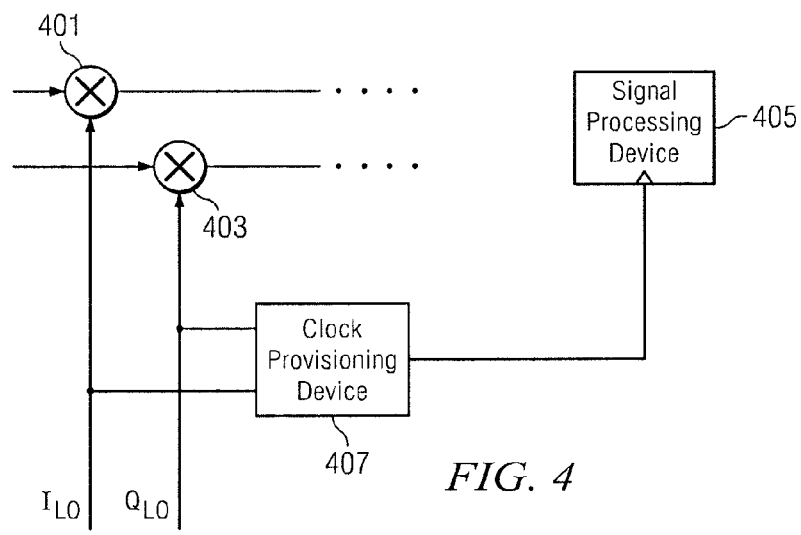
FIG. 4 shows a receiver.

FIG. 4 shows a block diagram of a receiving device with a first mixer 401, a second mixer 403, and a signal processing device 405. The receiving device comprises further a clock provision devise 407, whose output is connected to a clock input of the signal processing device.

Mixers 401 and 403 are controlled by the quadrature signals ILO and QLO. Frequency converter 407 is provided, for example, for generating a clock signal with a 50% duty cycle from the aforementioned quadrature signals by frequency division, for example, by the factor 2.5.

The frequency converter can be formed, for example, to count alternately the edges of the quadrature signals and generates a rising or falling edge in each 5th edge of the quadrature signals. In this case, the factor 2 represents the aforementioned natural number x. This case is shown in FIG. 5 for a clock generation device.

Figure 5:
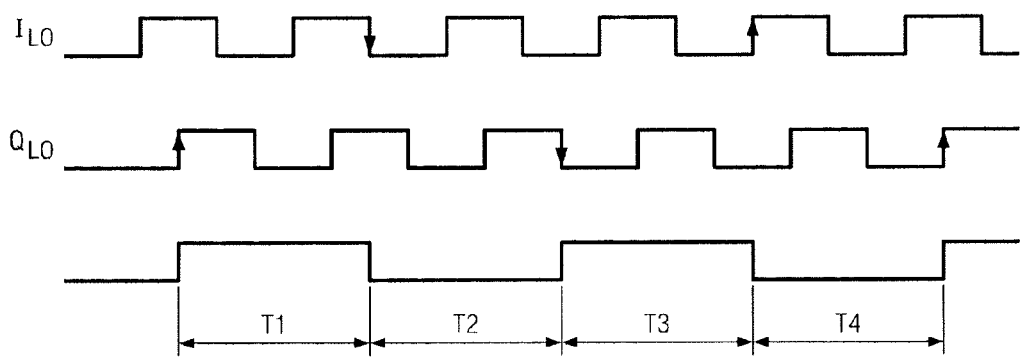
FIG. 5 shows a signal-time diagram.

In the top diagram of FIG. 5, the in-phase signal ILO is shown by way of example. In the middle timing diagram, the time course of the quadrature signal QLO is shown, which is shifted in phase by 90° compared with the in-phase signal ILO. In the bottom timing diagram, the resulting timing diagram of the clock signal is shown, which frequency converter 407 generates from the signals ILO and QLO.

Beginning with, for example, the rising edge of the quadrature signal QLO, a rising edge of the output signal of frequency converter 407 is generated. At the same time, the edges of the quadrature signals are counted alternately.

In this exemplary embodiment, the output clock signal is kept at a high level (high) until overall the 2(x+0.5)-th edge, in this example therefore the fifth edge, was counted. With the fifth edge, which in this exemplary embodiment corresponds to a falling edge of the in-phase signal, a falling edge of the output clock signal is generated, which thereupon enters the low-level state (low), and the edge counting begins anew. With the fifth edge, which in this exemplary embodiment corresponds to a falling edge of the quadrature signal, a rising edge of the output clock signal is generated, and this again shifts to the high-level state. In this way, an output clock signal with a 50% duty cycle is generated, which emerges from a division of the frequency of the quadrature signals by the factor 2.5. The time periods of the high-level states and the low-level states T1 to T4 are therefore the same.

A frequency converter of FIG. 5 can generate, for example, an output clock signal, reduced in frequency with a 50% duty cycle, based on quadrature signals. This type of frequency converter comprises, for example, a switching device whose output is connected to a first state machine, whose output in turn is connected to a clock input of another state machine. An output of the second state machine is connected to an input of the switching device. This frequency converter is also called, for example, a "phase switching divider." Frequency dividers are known per se, for example, from IEEE Journal of Solid State Circuits, Vol. 35, No. 7, July 2000 "A 5.3 GHz Programmable Divider for HiPerLAN in 0.25 μm CMOS".

FIG. 6 shows a so-called "double-edge-triggered" flip-flop with a first latch 901 and a second latch 903, whose outputs are connected to the inputs of a multiplexer 905. Multiplexer 905 comprises an output, which is coupled to the clock inputs of latches 901 and 903, the signal applied at the clock input of first latch 901 being negated.

FIG. 7a shows an arrangement of three double-edge triggered flip-flops 1001, 1003, 1005 for frequency division by the factor 2.5, which forms a clock generation device. Each of the flip-flops 1001, 1003, 1005 is triggered with a rising and falling edge. To this end, in each case two clock inputs are provided, to which the same clock signal can be applied; in each case, one of the inputs inverts the clock signal. A first flip-flop 1001 receives the signal D1 at its data input and outputs the signal Q1 to its output. An additional flip-flop 1003 receives the signal D2 at its data input and outputs the signal Q2 at its output. An additional flip-flop 1005 receives the signal D3 at its data input and outputs the signal Q3 at its output.

The signals D1, D2, and D3 are generated by means of a logic circuit 1007, shown in FIG. 7b, from the signals Q1, Q2, and Q3. In FIG. 7c, a possible state table is shown, for example, on whose basis the functionality of logic circuit 1007 can be realized.

FIG. 7d shows, for example, a timing diagram of a base signal ck and the associated output signal Q2 of the second flip-flop 1003 as a clock signal whose period would be 2.5 times the period of the base signal. The division factor F in this exemplary embodiment is $F=2+\frac{1}{2}=2.5$.

The invention is not limited to the shown embodiment variants in FIGS. 1 through 7d. For example, it is possible to use a different division factor F. The clock generation device can also perform in combination a multiplication and a division.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A receiver comprising:
   a mixer configured to mix a received signal in a receive path with an oscillation signal;
   an oscillator configured to output the oscillation signal as a base signal, which oscillates at a base frequency B;
   a clock generation device configured to generate at least one clock signal from the base signal, whose input is connected to the output of the oscillator, the clock generation device comprising a frequency divider, which is formed to divide the base frequency by a factor $F=x+A$ to generate a clock signal, where x is a positive whole number and A is approximately $\frac{1}{2}$ and wherein the clock signal has a frequency of approximately $B/(x+\frac{1}{2})$; and
   at least one signal processing device configured to process the output of the mixer in the receive path based on the clock signal generated by the frequency divider;

wherein the base signal comprises an in-phase signal and a quadrature-phase signal, the in-phase signal and the quadrature-phase signal having the same base frequency, wherein the frequency divider is configured to count alternately edges of the in-phase signal and of the quadrature-phase signal, to increase or decrease a counter state M for each counted edge, and wherein the frequency divider is further configured to generate a rising or falling edge at the counter state of M=2m+1, where m is a predefined positive whole number.

2. The receiver according to claim 1, wherein the clock generation device further comprises an additional frequency divider for dividing a clock frequency of the clock signal by a factor G=2y+1 into another clock signal with another clock frequency for another signal processing device, where y is a positive whole number.

3. A method comprising:
downmixing an incoming signal with a base signal generated by an oscillator to an intermediate signal, the base signal having a base frequency B and the intermediate signal having an intermediate frequency, the base signal comprising an in-phase signal and a quadrature phase signal;
generating clock signal by:
counting edges of the in-phase signal and of the quadrature-phase signal to increase or decrease a counter state M for each counted edge; and
generating a rising or falling edge of the clock signal at the counter state M=2m=1, where m is a predefined positive whole number, the clock signal having a frequency of approximately B/(m+½); and
processing the intermediate signal having the intermediate frequency as a function of the clock signal.

4. A receiver comprising:
a mixer configured to mix a received signal in a receive path with an oscillation signal;
an oscillator configured to output the oscillation signal as a base signal, which oscillates at a base frequency B;

a clock generation device configured to generate at least one clock signal from the base signal, whose input is connected to the output of the oscillator, the clock generation device comprising a frequency converter for converting the base frequency of the base signal by a factor F=x+A to geneate a clock signal, where x is a positive whole number and A is approximately ½ and wherein the clock signal has a frequency of approximately B/(x+½); and
a signal processing device configured to process the output of the mixer in the receive path based on the clock signal generated by the frequency converter;
wherein the base signal comprises an in-phase signal and a quadrature-phase signal, the in-phase signal and the quadrature-phase signal having the same base frequency, wherein the frequency converter is configured to count alternately edges of the in-phase signal and of the quadrature-phase signal, to increase or decrease a counter state M for each counted edge, and wherein the frequency converter is further configured to generate a rising or falling edge at the counter state of M=2m+1, where m is a predefined positive whole number.

5. The receiver according to claim 4, wherein the frequency converter comprises an edge counter for counting the edges.

6. A method comprising:
mixing an incoming signal with a base signal generated by an oscillator, the base signal comprising an in-phase signal and a quadrature phase signal, the in-phase signal and the quadrature phase signal having a base frequency B;
counting edges of the in-phase signal and the quadrature phase signal to increase or decrease a counter state M for each counted edge; and
generating a rising or falling edge of a clock signal at the counter state M=m+1, where m is a predefined positive whole number, the clock signal having a frequency of B/(m+½).

* * * * *

UNITED STATES PATENT AND TRADEMARK OFFICE
CERTIFICATE OF CORRECTION

PATENT NO. : 8,755,466 B2
APPLICATION NO. : 12/358329
DATED : June 17, 2014
INVENTOR(S) : Marco Schwarzmueller It is certified that error appears in the above-identified patent and that said Letters Patent is hereby corrected as shown below:

IN THE CLAIMS

Column 9, Line 29: After "counter state" and before "where m is" delete "M=2m=1," and insert -- M=2m+1, --.

Column 10, Line 35: After "counter state" and before "where m is" delete "M=m+1," and insert -- M=2m+1, --.

Signed and Sealed this
Tenth Day of March, 2015

Michelle K. Lee
*Deputy Director of the United States Patent and Trademark Office*